Jan. 13, 1953  J. W. KING ET AL  2,625,351
MOUNTING
Filed Aug. 13, 1948  2 SHEETS—SHEET 1
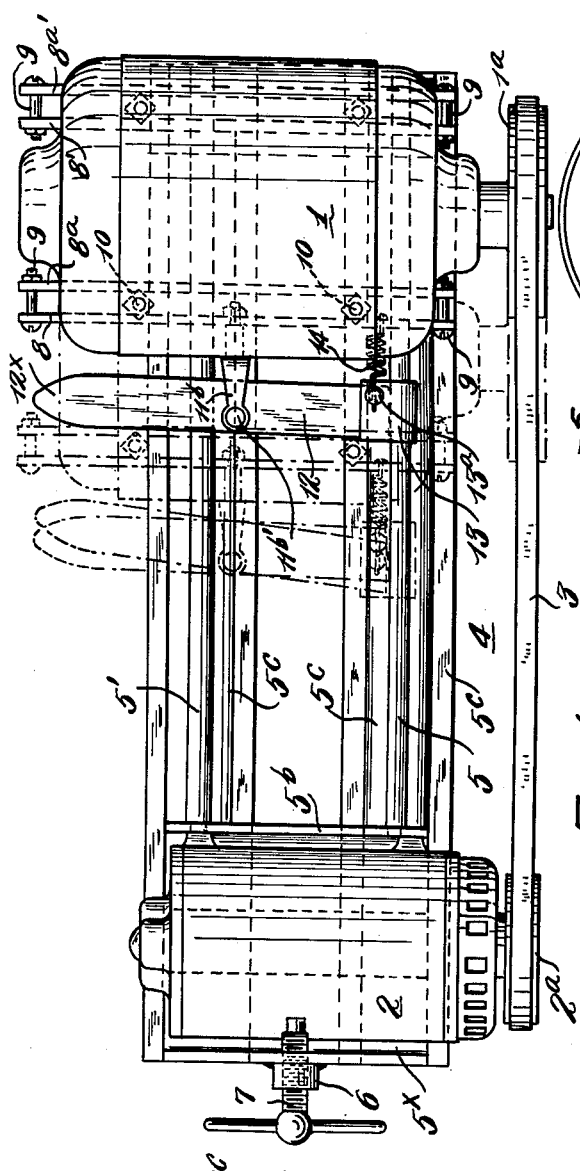
INVENTORS
JOHN W. KING
BY JAMES J. McNAMEE.
Geo. B. Pitts
ATTORNEY Jan. 13, 1953     J. W. KING ET AL     2,625,351
MOUNTING Filed Aug. 13, 1948     2 SHEETS—SHEET 2

INVENTORS
JOHN W. KING
BY JAMES J. McNAMEE

Geo. B. Pitts
ATTORNEY

Patented Jan. 13, 1953

2,625,351

UNITED STATES PATENT OFFICE 2,625,351

MOUNTING

John W. King and James J. McNamee, Cleveland, Ohio, assignors to Miles Park Machine & Tool, Inc., Cleveland, Ohio, a corporation of Ohio Application August 13, 1948, Serial No. 44,012

3 Claims. (Cl. 248—23)

This invention relates to apparatus comprising drivingly connected, spaced mechanisms; more particularly the invention is directed to an improved mounting having an adjustable supporting member for one of the mechanisms, and releasable locking means for the supporting member, whereby the latter may be readily initially fixed in adjusted position and readjusted, when necessary, to maintain the mechanisms in spaced relation and drivingly connected. One of the mechanisms consists of a motor arranged to drive parts of the other mechanism, whereby the latter may be subjected to tests. The mounting adapts itself for use where (a) a plurality of driven mechanisms to be tested or repaired are successively positioned for operation by the motor, each such replacement requiring a disassembly of the driving connection between the motor and driven mechanism and reassembly of the driving connections for the succeeding or replaced mechanism; and (b) during repair of the mechanisms repeated disassembly of the driving connections thereto and reassembly of the connections are required; in carrying out the above referred to operations, the releasable locking means for the supporting member provide for ready and quick adjustment thereof to move the device (motor or driven mechanism) supported on the supporting member into an inoperative position and into operative position, whereby the disassemblies and reassemblies of the driving connections are facilitated without loss of time.

The mounting also adapts itself to replacements where the mechanisms to be tested and/or repaired differ in size or construction, as well as other conditions, such as slack take-up in the driving belt, which may arise during operation of each driven mechanism. In the arrangement shown, the motor is removably secured to the movable supporting member of the mounting and drivingly connected through an endless member with a rotatable element of the mechanism to be tested or repaired.

The mounting includes between the movable supporting member and its supporting means spring actuated, manually releasable locking or gripping elements, which normally engage a portion of the supporting means under pressure to prevent movement of the supporting member in one direction, but are ineffective when the member is moved in the opposite direction. Accordingly, the locking and gripping elements may be released and the supporting member adjusted to an inoperative position to permit disassembly of the driving connections, but following the reassembly of the latter, upon movement of the supporting member to its operative position the locking and gripping elements are automatically effective to lock the supporting member against movement toward its inoperative position.

One object of the invention is to provide an improved mounting having supporting member movably mounted on a guide and a releasable locking means between the supporting member and its guide, said means being ineffective to permit movement of the member in one direction, but automatically operable to prevent movement thereof in the opposite direction, and adapted to be readily released for movement thereof in the opposite direction.

Another object of the invention is to provide in a mounting having a support and a slidable member thereon, improved releasable locking means therebetween spring tensioned in locking position, the locking means being ineffective when the slidable member is moved in one direction but automatically locks the member against movement in the opposite direction.

Another object of the invention is to provide in a mounting having a slidable member for supporting a mechanism which is to be held under tension exerted through a driving connection between it and a separate device, improved releasable locking means between the slidable member and its support normally spring tensioned in locking position, the locking means being ineffective when the slidable member is moved in a direction to increase the tension between the mechanism and the device, and responsive to the tension exerted by the driving connections between the mechanism and the device to prevent movement of the member in the opposite direction.

Another object of the invention is to provide, in apparatus having related driving and driven mechanisms, an improved mounting for one of the mechanisms, whereby the latter may be quickly adjusted into inoperative and operative positions to permit the driving connections between the mechanisms to be readily disconnected and reconnected.

Other objects of the invention will be apparent to those skilled in the art to which our invention relates from the following description taken in connection with the accompanying drawings, wherein:

Fig. 1 is a plan view of an apparatus, one mechanism of which is secured to the movable member of a mounting embodying our invention.

Fig. 1a is a fragmentary plan view on the line 1a—1a of Fig. 2, parts being broken away.

Fig. 2 is a side elevation of the parts shown in Fig. 1.

Figure 3:
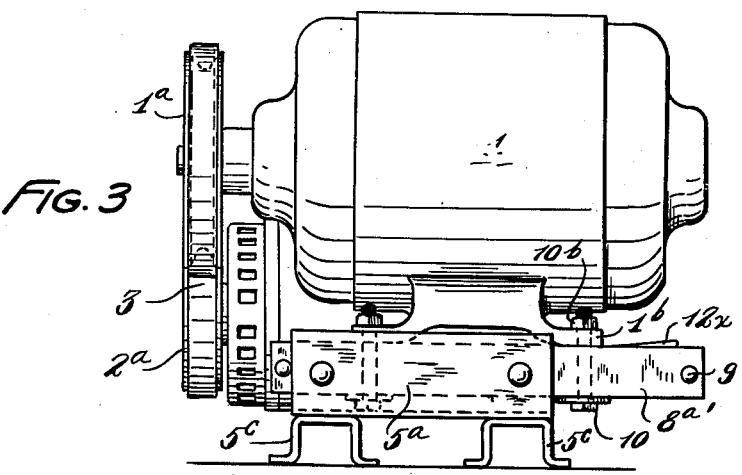
Fig. 3 is an end elevation looking toward the left of Figs. 1 and 2.
Figure 4:
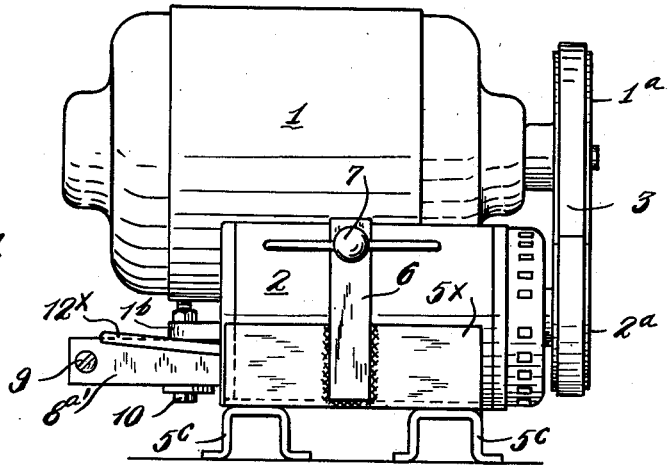
Fig. 4 is an end elevation looking toward the right of Figs. 1 and 2.
Figure 5:
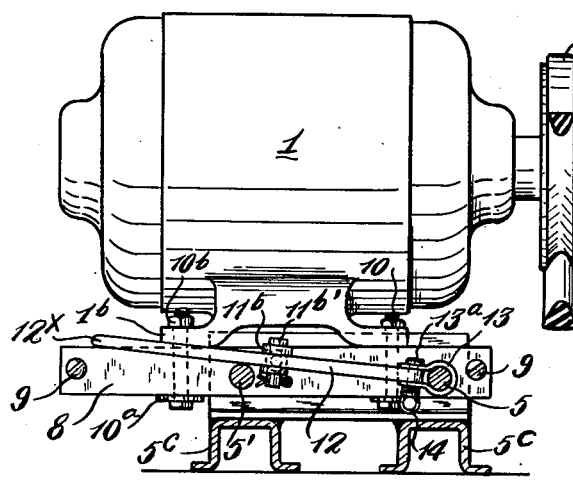
Fig. 5 is a section on the line 5—5 of Fig. 2.

In the drawings, 1 indicates as an entirety a motor and 2 indicates as an entirety a mechanism, which, for illustrative purposes, consists of a generator requiring testing and/or repair. In this arrangement, the driving connections between the motor 1 and generator 2 preferably consist of an endless member 3, such as a belt, engaging pulleys 1a, 2a, on shafts of the motor 1 and generator 2, respectively. In practice, where the operations consist in testing and/or repairing mechanisms, the mounting comprises suitable supporting means, indicated as an entirety at 4, and a member, indicated as an entirety at 4a, slidably mounted thereon, for supporting the motor 1. The supporting means 4 consist of a pair of spaced parallelly related guides 5, 5', rigidly connected at their inner and outer ends to upstanding members 5a, 5b, which may be positioned on a table or bench. By preference, the member 5a is supported on and secured to the adjacent ends of a pair of inverted channels 5c, whereas the member 5b consists of the inner side wall of a U-shaped member 5x mounted on and suitably secured to the opposite ends of the channels 5c. The U-member 5x provides a pocket in which the generator 2 may be rigidly secured. In this arrangement the outer side wall of the U-member 5x is provided with an upstanding member 6 which is formed with a screw threaded opening 6a for a screw 7. The screw 7 is adapted to detachably engage the upper portion of the generator 2 and clamp it against the walls of the U-member 5x.

The supporting member 4a is shown as consisting of spaced pairs of spacedly connected cross bars 8, 8a, and 8', 8a', the bars being formed with alined openings through which the guides 5, 5' extend to guide the pairs of cross bars. The bars of each pair are suitably rigidly connected together by bolts 9 and spaced by sleeves through which the bolts 9 extend. The spacing of the bars of each pair 8, 8a, and 8', 8a', accommodates between them bolts 10 which extend through openings formed in the feet 1b of the motor 1. As shown, the head of each bolt 10, through a washer 10a, engages the lower edges of the adjacent pair of cross bars and a nut 10b threaded on the outer end portion of the bolt engages the adjacent motor foot 1b to securely clamp the motor 1 to the cross bars. The pairs of cross bars 8, 8a, and 8', 8a', are rigidly indirectly connected together through the feet 1b of the motor 1 and its casing and therefore move as a unit along the guides 5, 5', in either direction; as the pairs of cross bars are not directly connected together it will be observed that prior to mounting a motor thereon, they may be relatively adjusted for engagement by the feet of motors, which are differently spaced, with openings in the feet in position in alinement to receive the bolts 10.

The releasable locking means, indicated as an entirety at 11, consist of the following; 11a indicates an arm fixed to the cross bar 8 and extending outwardly thereof parallel to and between the guides 5, 5'. The arm 11a preferably consists of a hollow shank terminating in a bifurcated member 11b in which a gripping element 12, extending transversely of the guides 5, 5' is pivotally mounted, by means of a pivot 11b'. A cap screw 11c extends through an opening in the cross bar 8 and is threaded into the shank of the arm 11a to secure the latter in position. The inner end of the element 12 is inclined from its outer side edge inwardly, as shown at 12a and arranged to engage the adjacent side of the adjacent guide 5, as later set forth. 13 indicates a separate gripping element arranged to engage the opposite side of the adjacent guide 5 and pivotally connected to the inner end portion of the element 12 between the guides 5, 5. As shown, the gripping element 13 is elongated longitudinally of the adjacent guide 5. By preference, the gripping element 13 is loop shaped in cross section so as to surround the adjacent guide 5, whereby it is slidably supported thereon during movement or adjustment of the member 4a in either direction, the opposite ends of the loop being extended into overlapping relation with the inner end portion of the element 12 and pivotally connected thereto by a bolt 13a. 14 indicates a coiled spring connected at its outer end to the pivot 13a, its inner end being suitably anchored to the cross bar 8. The spring 14 serves to swing the pivoted together ends of the elements 12 and 13 inwardly; that is, to rock the gripping element 12 about the pivot 11b' counter-clockwise, as viewed in Figs. 1 and 1a and to swing the gripping element 13 clockwise (as the element 13 rests on the adjacent guide, it is free to rock thereon on a substantially vertical axis), the effect of which is to cause a gripping of the adjacent guide 5 under pressure, at its opposite sides by the inclined end 12a of the element 12 and outer end or side portion of the element 13 and thus lock the member 4a against movement toward the generator 2. The gripping element 12 is preferably extended transversely beyond the pivot 11b' to form a handle 12x, which, when operated to swing the element 12 clockwise, as shown in dotted lines in Fig. 1, it simultaneuosly releases the elements 12, 13, from the adjacent guide 5, whereby the supporting member 4a and motor 1 may be adjusted or moved to the position shown in dotted lines in Fig. 1. From the foregoing description it will be observed that the elements 12, 13, form a toggle arranged to resist movement of the member 4a in the direction in which force or pull is transmitted thereto, but is ineffective when the member 4a is moved in the opposite direction.

*Operation.*—Figs. 1 and 2 show the motor 1 in fixed or operative position and drivingly connected through the belt 3 to the generator 2. If now the generator 2 is to be removed for inspection or replaced by another generator, the locking means 11 is operated by the handle 12x to release it from the adjacent guide 5 and the supporting member 4a and motor 1 are adjusted or moved to the inoperative position (see dotted lines in Fig. 1), whereby the belt 3 may be disengaged from the pulley 2a and the generator 2 removed; upon replacing the generator 2 or another generator, the belt 3 is first engaged with the pulley 2a and then pressure or a push force is applied to the member 4a or motor 1 to move them to the operative position; that is, that position wherein slack is eliminated from the belt 3 and the latter is under sufficient tension to transmit power from the pulley 1a to the pulley 2a. Although in this movement of the member 4a to the operative position the toggle elements 12, 13, engage the opposite sides of the guide 5, under the influence of the spring 14, they are ineffective to grip the guide, but upon stoppage of the member 4a at the operative position the elements 12, 13, are automatically effective to prevent movement of the member in the opposite direction. Accordingly, the motor 1 can be moved toward the right, as viewed in Figs. 1 and 2, until the belt 3 is under driving tension and then stopped and automatically locked against movement in the opposite direction. It will be noted that the element 12 of the locking means 11 is pivotally connected to the member 4a and that the spring 14 is connected to the inner pivoted ends of the elements 12, 13, inwardly of edges which engage the adjacent guide 5, so that during movement of the motor from its inoperative position to its operative position the elements ride on but are ineffective to grip the guide 5. However, since the element 13 is supported on the guide 5 and the spring 14 serves to maintain the gripping edges of the elements 12, 13, in engagement with opposite sides of the guide 5, any force applied to the member 4a directly or through the motor 1, to move the motor toward its inoperative position, will effect a gripping of the guide proportional to the applied force and hence maintain a locked relation between the member 4a and the guide. It will thus be seen that when the member 4a and motor 1 are moved to the operative position, the belt 3 will have a driving relation with the pulleys 1a, 2a, and exert tension tending to move the member 4a toward the inoperative position, but as the member 4a, when adjusted or moved to the desired operative position, is automatically locked to the guide the belt will be maintained in driving relation and any slack therein may be readily eliminated by pushing the member 4a to a new operative position.

To those skilled in the art to which our invention relates, many changes in construction and widely differing embodiments and applications thereof will suggest themselves without departing from the spirit and scope of the invention. Our disclosures and the description herein are purely illustrative and are not intended to be in any sense limiting.

What we claim is:

1. In a mounting, the combination with a support having a guide and a member for supporting a mechanism slidably mounted on said guide, of releasable means for locking said member in an adjusted position to said guide against movement in one direction, said means consisting of a pair of gripping elements having inner end portions disposed in overlapping relation at one side of said guide, pivotal connections between said overlapping end portions, one of said elements being swingably mounted on said member and terminating at its inner end at one side of and in alinement with said guide and the other element extending over said guide and having sliding and pivotal engagement therewith and provided with a laterally extending portion disposed on the opposite side of said guide, and a spring anchored at one end on said member and connected at its opposite end to one of said elements and arranged to operate said elements in a direction to effect engagement of the inner end of said swingably mounted element and lateral portion of the other element with said guide to prevent movement of said member in one direction, one of said elements being provided with a handle for operating said elements in the opposite direction to effect disengagement of said elements from said guide.

2. In a mounting, the combination with a support having a guide and a member for supporting a mechanism slidably mounted on said guide, of a gripping element disposed at substantially right angles to said guide, swingably mounted on said member remote from said guide, the inner end of said element being disposed at one side of said guide for engagement with and dis-engagement from the latter, a separate gripping element elongated longitudinally of said guide and slidably and swingably supported thereon, the inner end portion of said separate gripping element having overlapping relation with the inner end portion of said first mentioned gripping element and pivotally connected thereto, the outer end of said separate gripping element being provided with a laterally extending portion disposed at the opposite side of said guide, a spring anchored at one end on said member and connected at its opposite end to one of said elements and arranged to swing said elements in a direction to effect engagement of the inner end of said first mentioned gripping element and said laterally extending portions of said separate gripping element with the opposite sides of said guide to prevent movement of said member in one direction, and a device connected to one of said elements for swinging said elements in the opposite direction to disengage them from said guide.

3. In a mounting, the combination with a pair of spaced parallelly related guides and a member adapted to support a body slidably mounted on said guides, of gripping elements disposed substantially in end to end relation and adapted to substantially simultaneously engage or disengage the opposite sides of one of said guides, one of said elements consisting of a lever fulcrumed on said member, one end portion of said lever being operable as a handle and that end of said lever remote from said handle terminating adjacent one side of said guide and pivotally connected to the adjacent end portion of the other element, and said other element consisting of a member elongated longitudinally of said guide and swingably and slidably supported on the latter and having a side portion disposed on the opposite side of said guide, and a spring anchored at one end on said slidably mounted member and connected at its opposite end to one of said elements for swinging said elements toward said slidably mounted member, whereby the terminating end of said lever and the side portion of said elongated member engage the opposite sides of said guide to prevent movement of said slidably mounted member in one direction, said elements, upon operation of said handle in opposition to the tension of said spring to disengage said elements from said guide, being ineffective to permit movement of said member in the first mentioned direction.

JOHN W. KING.
JAMES J. McNAMEE.

REFERENCES CITED

The following references are of record in the file of this patent:

UNITED STATES PATENTS

| Number | Name | Date |
|---|---|---|
| 1,272,866 | Shorb | July 16, 1918 |
| 1,704,357 | Baume | Mar. 5, 1929 |
| 2,418,332 | Burrows | Apr. 1, 1947 |